United States Patent
France (10) Patent No.: US 8,094,665 B1
(45) Date of Patent: *Jan. 10, 2012

(54) PACKET FORWARDING USING INTERMEDIATE POLICY INFORMATION

(75) Inventor: Robert M. France, Carlisle, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/882,730

(22) Filed: Sep. 15, 2010

Related U.S. Application Data (63) Continuation of application No. 10/777,391, filed on Feb. 12, 2004, now Pat. No. 7,801,149.

(51) Int. Cl.
*H04L 12/56* (2006.01)
(52) U.S. Cl. .................................. 370/395.21; 370/466
(58) Field of Classification Search ............... 370/310.2, 370/389, 392, 395.2, 395.21, 395.5, 395.52, 370/395.53, 395.6, 400, 466, 467, 486; 709/223
See application file for complete search history.

(56) References Cited

U.S. PATENT DOCUMENTS

| | | | |
|---|---|---|---|
| 5,251,205 A * | 10/1993 | Callon et al. .................. 370/392 |
| 5,684,791 A * | 11/1997 | Raychaudhuri et al. .... 370/310.2 |
| 6,041,039 A | 3/2000 | Kilkki et al. |
| 6,243,394 B1 * | 6/2001 | Deng ............................. 370/466 |
| 6,331,987 B1 * | 12/2001 | Beser ............................ 370/486 |
| 6,434,612 B1 * | 8/2002 | Hughes et al. ................ 709/223 |
| 6,463,068 B1 | 10/2002 | Lin et al. |
| 7,801,149 B1 | 9/2010 | France |
| 2002/0032800 A1 | 3/2002 | Puuskari et al. |
| 2002/0044558 A1 * | 4/2002 | Gobbi et al. ............. 370/395.52 |
| 2002/0083178 A1 | 6/2002 | Brothers |
| 2003/0053464 A1 * | 3/2003 | Chen et al. .................... 370/400 |
| 2003/0118026 A1 * | 6/2003 | Kuhl et al. ............... 370/395.21 |
| 2003/0219023 A1 * | 11/2003 | Miyata et al. ............ 370/395.53 |

* cited by examiner

*Primary Examiner* — Andrew Lai
(74) *Attorney, Agent, or Firm* — Shumaker & Sieffert, P.A.

(57) ABSTRACT

Intermediate policy information is used to translate policy information between forwarding domains. For example, a network device may associate intermediate policy information, such as intermediate CoS information, with a packet. The network device utilizes the intermediate CoS information to indirectly map first class of service (CoS) information that conforms with a first protocol to second CoS information that conforms to a second protocol. The network device may, for example, apply a first policy to map the first CoS information to the intermediate CoS information and a second policy to map the intermediate CoS information to the second CoS information.

29 Claims, 5 Drawing Sheets

PACKET FORWARDING USING INTERMEDIATE POLICY INFORMATION

This application is a continuation of application Ser. No. 10/777,391, filed Feb. 12, 2004, now U.S. Pat. No. 7,801,149, the entire content of which is incorporated herein by reference.

TECHNICAL FIELD

The invention relates to computer networks and, more particularly, to techniques for controlling forwarding of packets within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within a network, referred to as routers, maintain routing information that describes available routes through the network. Each route defines a path between two locations on the network. Upon receiving an incoming data packet, the router examines header information within the packet to identify the destination for the packet. Based on the header information, the router accesses the routing information, selects an appropriate route for the packet and forwards the packet accordingly.

The network devices typically communicate packets in conformance with a communication protocol. Example protocols include the Internet Protocol (IP), Multiprotocol Label Switching (MPLS), Virtual Local Area Network (VLAN), Frame Relay, Asynchronous Transfer Mode (ATM), Layer 2 Tunneling Protocol (L2TP), and the Point-to-Point protocol (PPP).

Many conventional network protocols support class of service (CoS) information, which can be used in controlling traffic flow. For example, packets can be queued and forwarded based on the CoS information associated with each packet. In particular, prioritization schemes may be implemented in accordance with class of service information, and streams of packets may be assigned to different service levels. Higher priority packet streams receive higher forwarding priority. Example CoS information used by conventional protocols includes IP Type of Service (ToS), MPLS experimental (EXP) bits, VLAN user priority, and IPv6 traffic class. Typically, CoS information is encoded within the header information associated with each packet.

The various protocols often required different formats and techniques for supporting and communicating the CoS information. Consequently, network devices, such as routers, often employ complex mapping techniques to preserve CoS information when packets are forwarded from one forwarding domain to another, i.e., from one protocol to another. In effect, the network devices utilize the mapping techniques to reformat the CoS information carried by the packets based on the particular protocols being used.

Due to the large number of protocols, however, these mapping techniques quickly become very complex and cumbersome. For example, these mapping techniques typically require a unique mapping between every combination of protocols supported by the network device in order to ensure that CoS information can be correctly conveyed as packets are forwarded between the protocols. The number and complexity of these protocol mappings, therefore, increases substantially as the number of protocols supported by a network device increases.

SUMMARY

In general, the invention is directed to techniques that utilize intermediate class of service (CoS) information to indirectly map protocol-specific CoS information between forwarding domains. More specifically, when forwarding a packet from a first forwarding domain to a second forwarding domain, CoS information conveyed by the packet is mapped from the protocol-specific CoS information of the first forwarding domain to intermediate CoS information that is protocol independent. The intermediate CoS information is then mapped to protocol-specific CoS information that conforms to the network protocol supported by the second forwarding domain. In this manner, the intermediate CoS information is used to indirectly map CoS information between forwarding domains that otherwise have incompatible representations of CoS information.

In practice, a network device, such as a router, maintains a set of policies to implement the intermediate mapping scheme described herein. For example, the network device may apply a policy associated with the first forwarding domain to map the protocol-specific CoS information of the packet to the intermediate, protocol-independent CoS information. The network device then applies a policy associated with the second forwarding domain to map the intermediate CoS information to protocol-specific CoS information that conforms to the second forwarding domain.

In this manner, the intermediate CoS information may be viewed as policy-related metadata that is associated with a packet as the packet is processed within a network device. For example, the intermediate CoS information may be stored within memory of the network device and associated with packets as the packets traverse the device. In this manner the intermediate CoS information does not affect the contents of the packets as the packets appear to the processing layers within the network device. Consequently, the intermediate CoS information provides a universal classification mechanism within the network device that can be utilized by various policies to classify CoS information anywhere along the internal packet-processing path of the network device from the first ingress interface to the last egress interface, i.e., the entire time a packet is being forwarded within the network device.

In addition, the network device provides full user-control over the intermediate mapping. For example, a user can define and configure policies, such as CoS mappings, for a variety of applications. Consequently, the user may have complete control of how the intermediate CoS information is mapped by a particular policy.

In this manner, the intermediate CoS information may be viewed more generally as user-controlled, per-packet metadata that can be used to control packet-processing within the network device. Controlling CoS processing is, therefore, but one example. For example, a user can define and attach a policy to an interface that maps any combination of a corresponding protocol layer's header fields, including, but not restricted to CoS, to intermediate policy information. Subsequent policies within the network device can then map the intermediate policy information as necessary, possibly in combination with other information, to other interfaces' header fields to control packet processing.

In one embodiment, a method comprises receiving a packet having a first class of service (CoS) information that conforms to a first one of the at least three network protocols, and indirectly mapping the first CoS information to a second CoS information using an intermediate CoS information. The second CoS information conforms to a first one of the at least three network protocols. The method further comprises forwarding the packet with the second CoS information.

In another embodiment, a system comprises a first interface to receive a packet having a first class of service (CoS) information that conforms to a first one of the at least three network protocols, wherein the first interface maps the first CoS information to an intermediate CoS information. The system further comprises a second interface to map the intermediate CoS information to a second CoS information that conforms to a first one of the at least three network protocols.

In a further embodiment, a network device comprises a control unit that associates intermediate CoS information with a packet to indirectly map first class of service (CoS) information that conforms with a first one of the at least three network protocols to second CoS information that conforms to a first one of the at least three network protocols.

In another embodiment, a computer-readable medium comprises instructions. The instructions cause a programmable processor to receive a packet having a first class of service (CoS) information that conforms to a first one of the at least three network protocols, and process the packet to include intermediate CoS information for indirectly mapping the first CoS information to a second CoS information that conforms to a first one of the at least three network protocols.

In another embodiment, a method comprises processing a packet with a first interface to associate the packet with metadata that defines protocol-independent policy information, and subsequently processing the packet with a second interface in accordance with the protocol-independent policy information.

The invention may provide one or more advantages. For example, by making use of intermediate CoS information, a network device may be able to preserve CoS information between different forwarding domains without maintaining policies to directly map between every combination of protocols supported by the network device. Instead, the network device need only maintain polices for mapping between the protocol-specific types of CoS information and the intermediate CoS information. Consequently, the number of policies maintained may be reduced.

Moreover, policies that make use of the intermediate CoS information may be fully configurable by a user and, therefore, can readily be adapted for a wide variety of applications. Additionally, as policy-related metadata, the intermediate CoS information can be utilized by policies and attached to packets as a universal CoS classification mechanism without impacting the router's packet handling behavior other than that specified by the user-defined policies.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
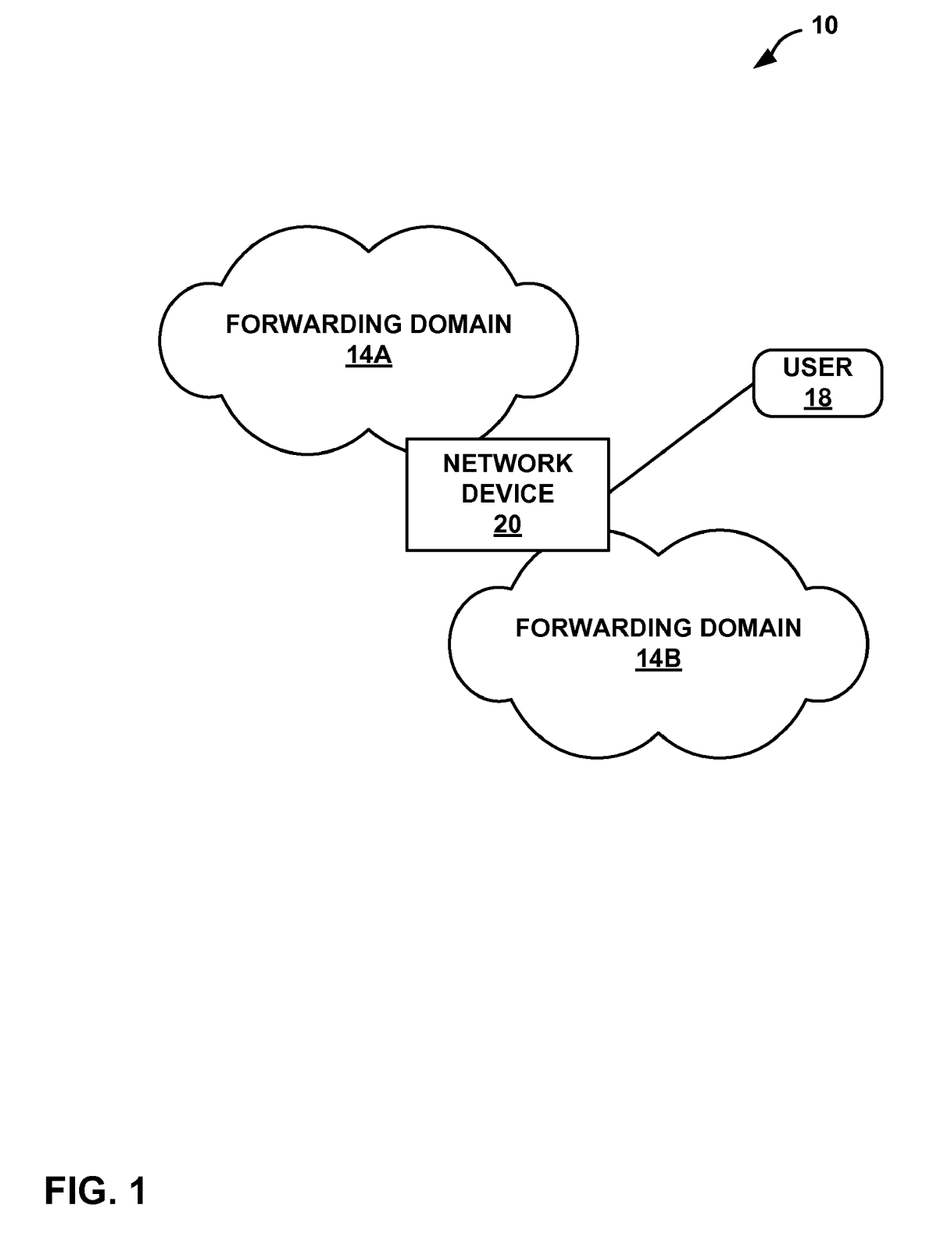
FIG. 1 is a block diagram illustrating an exemplary network environment in which a network device utilizes intermediate class of service (CoS) information when forwarding packets between forwarding domains.

FIG. 1 is a block diagram illustrating an exemplary network 10 in which a network device 20 utilizes intermediate class of service (CoS) information consistent with the principles of the invention. As illustrated in FIG. 1, network device 20 couples forwarding domains 14A, 14B (collectively, "forwarding domains 14").

In general, each of forwarding domains 14 represent network environments that employ different protocols for communicating packets. For example, each one of forwarding domains 14 may be a portion of a network or one or more networks, and may include one or more devices that communicate network packets. Example devices include personal computers, laptop computers, handheld computers, workstations, servers, routers, switches, printers, fax machines, or the like. Each of forwarding domains 14 may also include one or more Local Area Networks (LANs), Wide Area Network (WANs), Internet Service Provider (ISP) networks, or other network environments.

Devices within each one of forwarding domains 14 generate data and format the data in accordance with network protocols. For example, forwarding domain 14A may represent an Internet Protocol (IP)-based network, while forwarding domain 14B may represent a network environment utilizing Multiprotocol Label Switching (MPLS). As another example, forwarding domain 14A may represent a Virtual Large Area Network (VLAN) while forwarding domain 14A represents a network utilizing the Internet Protocol version 6 (IPv6).

Consequently, each of forwarding domains 14 may support different types of CoS information for controlling and prioritizing traffic flow within the respective forwarding domains. Consistent with the principles of the invention described herein, network device 20 utilizes intermediate CoS information to indirectly map protocol-specific CoS information as it forwards packets between forwarding domains 14.

For example, when forwarding a packet from forwarding domain 14A to forwarding domain 14B, network device 20 maps protocol-specific CoS information conveyed by the packet to intermediate CoS information that is protocol independent. Network device 20 then maps the intermediate CoS information to protocol-specific CoS information that conforms to the network protocol supported by forwarding domain 14B. In this manner, network device 20 makes use of intermediate CoS information to map CoS information between forwarding domains 14 that otherwise have incompatible representations of CoS information. In similar fashion, network device 20 may utilize intermediate CoS information when forwarding packets from forwarding domain 14B to forwarding domain 14A.

In practice, network device 20 may maintain a set of policies to implement the intermediate mapping scheme described herein. For example, network device 20 may apply a policy associated with forwarding domain 14A to map protocol-specific CoS information of the packet to the intermediate, protocol-independent CoS information. Network device 20 then applies a policy associated with forwarding domain 14B to map the intermediate CoS information to protocol-specific CoS information that conforms to the second forwarding domain.

By making use of intermediate CoS information, network device 20 is able to preserve CoS information between forwarding domains 14 without maintaining a direct mapping between the protocols supported by the forwarding domains. Instead, network device 20 need only support polices for mapping between the protocol-specific types of CoS information supported by the network device and the intermediate CoS information. Consequently, as network device 20 supports additional forwarding domains, the number of policies maintained by the network device and the overall complexity of the mapping scheme may be reduced from conventional direct mapping techniques.

The intermediate CoS information may be viewed as policy-related metadata that accompanies the packet as it is processed within network device 20. Consequently, the intermediate CoS information provides a universal classification mechanism that can be utilized by a policy anywhere along the internal packet processing path of network device 20. Thus, virtually any policy may be used in defining how intermediate CoS information is mapped. Additionally, the intermediate CoS information can be utilized within network device 20 without impacting the device's packet handling behavior other than as prescribed by the specific policies.

Network device 20 may present an interface by which user 18 defines and configures the internally applied policies. Consequently, user 18 can adapt the intermediate CoS information for a wide variety of applications.

Although described herein with respect to CoS information, the techniques may be viewed more generally as utilizing user-controlled, per-packet metadata to control packet-processing within network device 20. Controlling CoS processing is, therefore, but one example, and the techniques described herein may utilize intermediate policy information generally. For example, user 18 can define and attach a policy to an interface that maps any combination of a corresponding protocol layer's header fields, including, but not restricted to CoS, to intermediate policy information. Subsequent policies within the network device can then map the intermediate policy information as necessary, possibly in combination with other information, to other interfaces' header fields to control packet processing.

Network device 20 may be any device that communicates data between forwarding domains within a network environment. For example network device may be a packet-based router, such as a customer edge router, a service provider (SP) edge router, a core router, or other routing device. Alternatively, network device may be a switch, intelligent hub or other device.

Figure 2:
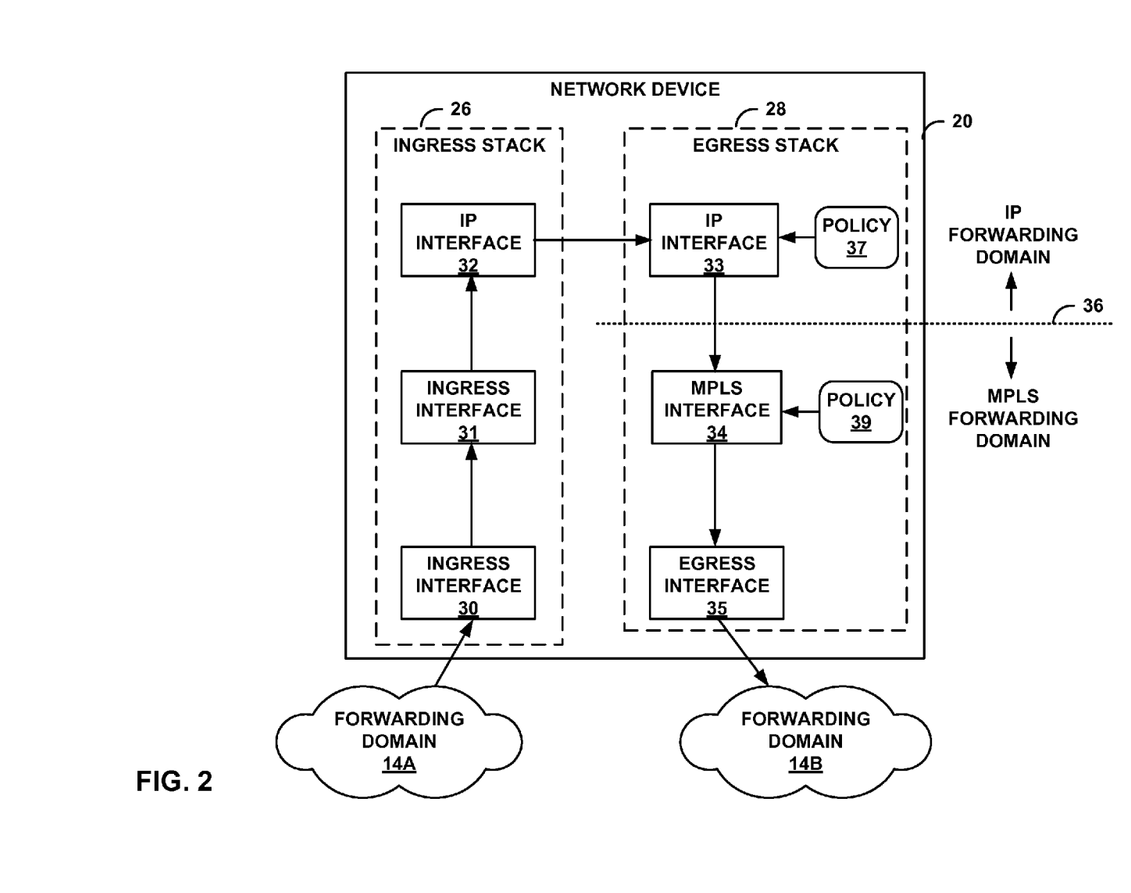
FIG. 2 is a conceptual diagram illustrating an exemplary network device that internally utilizes intermediate CoS information consistent with the principles of the invention.

FIG. 2 is a block diagram illustrating an exemplary embodiment of network device 20. In the illustrated example, forwarding domain 14A represents a network environment that supports the Internet Protocol (IP), and forwarding domain 14B represents a network environment that supports the Multiprotocol Label Switching (MPLS) protocol. As described in further detail below, network device 20 utilizes intermediate CoS information to provide an indirect mapping between protocol-specific CoS information of forwarding domain 14A and protocol-specific CoS information of forwarding domain 14B.

In general, the internal packet-processing path of network device 20 may be represented as an ingress stack 26 and an egress stack 28. Each of stacks 26, 28 represent protocol stacks, and include logical interfaces associated with protocols supported by network device 20. For example, ingress stack 26 includes ingress interface 30, ingress interface 31, and IP interface 32. Egress stack 28 includes IP interface 33, MPLS interface 34 and egress interface 35. Ingress interfaces 30 and 31 may be associated with lower-level, e.g., layer two, protocols for receiving packets from forwarding domain 14A. Similarly, egress interface 35 may be associated with a lower-level protocol for transmitting packets to forwarding domain 14B. Examples of lower-level protocols include Frame Relay, Point-to-Point Protocol (PPP), and other protocols. IP interfaces 32, 33 and MPLS interface 34 are layered on top of ingress interfaces 30, 31 and egress interface 35, respectively.

In general, network device 20 receives a packet from forwarding domain 14A, and, and propagates the packet up ingress stack 26. As the packet propagates up ingress stack 26, ingress interfaces 30, 31 and IP interface 32 process the packet in accordance with their respective protocols. This process typically includes removing layers of information, e.g., header information, carried by the packet. In similar fashion, IP interface 33, MPLS interface 34 and egress interface 35 process the packet layers as the packet propagates down egress stack 28, e.g., by adding layers of information. After the packet is processed by egress interface 35, network device 20 forwards the packet to forwarding domain 14B in accordance with a second protocol.

In the example shown in FIG. 2, egress stack 28 includes a transition point 36 where IP interface 33 forwards an outbound packet to MPLS interface 34. Conceptually, at transition point 36 the outbound packet may viewed as passing from IP forwarding domain 14A to MPLS forwarding domain 14B. In other words, at transition point 36, the outbound packet includes IP-specific information, and is forwarded to MPLS interface for the addition of MPLS information.

As network device 20 processes a packet, any one or more of interfaces 30-35 may apply policies to control the processing and forwarding of the packets. For example, IP interface 33 may apply a policy 37 to map IP-specific CoS information of the packet to intermediate CoS information that is protocol independent. IP interface 33 sets policy-related metadata that is associated with the received packet, and forwards the packet to MPLS interface 34.

MPLS interface 34 may apply policy 39 to map the intermediate CoS information of the packet to MPLS-specific CoS information, and update the packet by adding MPLS header information that specifies the MPLS-specific CoS information. In this manner, network device 20 is able to preserve CoS information between forwarding domains 14 without maintaining a direct mapping for translating IP-specific CoS information to MPLS-specific CoS information. Consequently, the number of policies maintained by network device 20 may be reduced because the device need not maintain policies for directly mapping between each combination of supported protocols.

Figure 3:
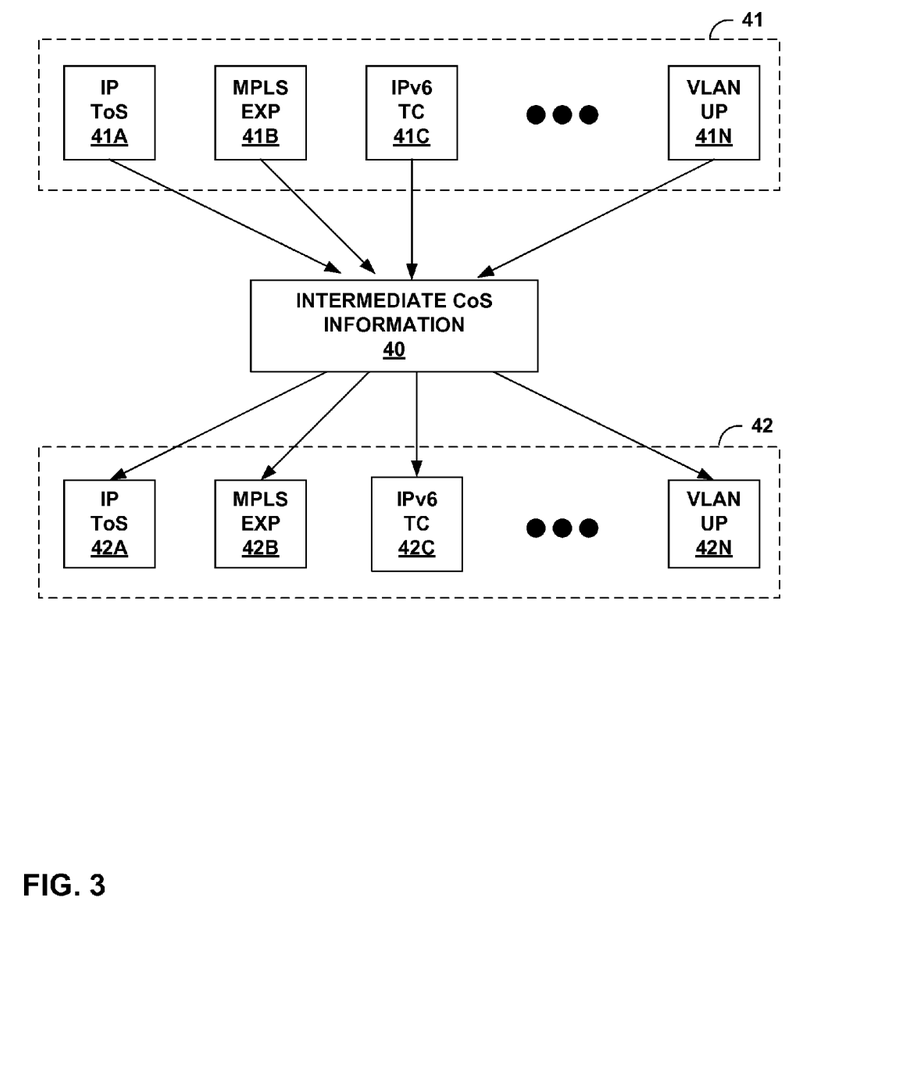
FIG. 3 is a conceptual drawing illustrating the use of intermediate CoS information to indirectly map between protocol-specific CoS information.

FIG. 3 is a conceptual drawing illustrating the use of intermediate CoS information to indirectly map between protocol-specific CoS information consistent with the principles of the invention. A network device, such as network device 20 of FIG. 1, receives packets carrying inbound CoS information 41 that may conform to any of a variety of protocols. For example, the network device may receive packets carrying CoS information in the form of IP Type of Service (ToS) information 41A, MPLS experimental (EXP) bits 41B, IPv6 traffic class 41C, VLAN User Priority (UP) 41N or other forms of protocol-specific CoS information. In this example, N represents the number of protocols supported by the network device.

When processing these inbound packets, the network device maintains and applies protocol-specific policies to map the inbound CoS information 41 to intermediate CoS information 40, which is protocol independent. More specifically, the network device typically sets metadata, that is associated with the received packets. For example, the network device may set one or more bytes of metadata in a router memory. Each of the one or more bytes of CoS information is associated with each of the received packets. In one embodiment, the metadata maintains association with the packets the entire time the packets are being forwarded within the network device. At a downstream point within its internal packet processing path, the network device applies protocol-specific policies to map intermediate CoS information 40 to outbound CoS information 42 based on the outbound protocol with which the packets are forwarded.

As one example, the network device may receive an inbound packet from an interface supporting the IP protocol and destined for an outbound interface supporting the MPLS protocol. In this case, the network device maps IP ToS information 41A of the inbound packet to intermediate CoS information 40 by applying an IP-specific policy. During this process, the network device sets metadata associated with the packet to carry intermediate CoS information 40. This universal, policy-related metadata is associated with the packet as the packet is forwarded through the internal processing path of the network device. At a downstream interface, the network device applies an MPLS-specific policy to formulate MPLS EXP bits 42B in view of intermediate CoS information 40. At this point, the MPLS-specific policy wraps the packet with MPLS EXP bits 42B in accordance with MPLS specifications.

Figure 4:
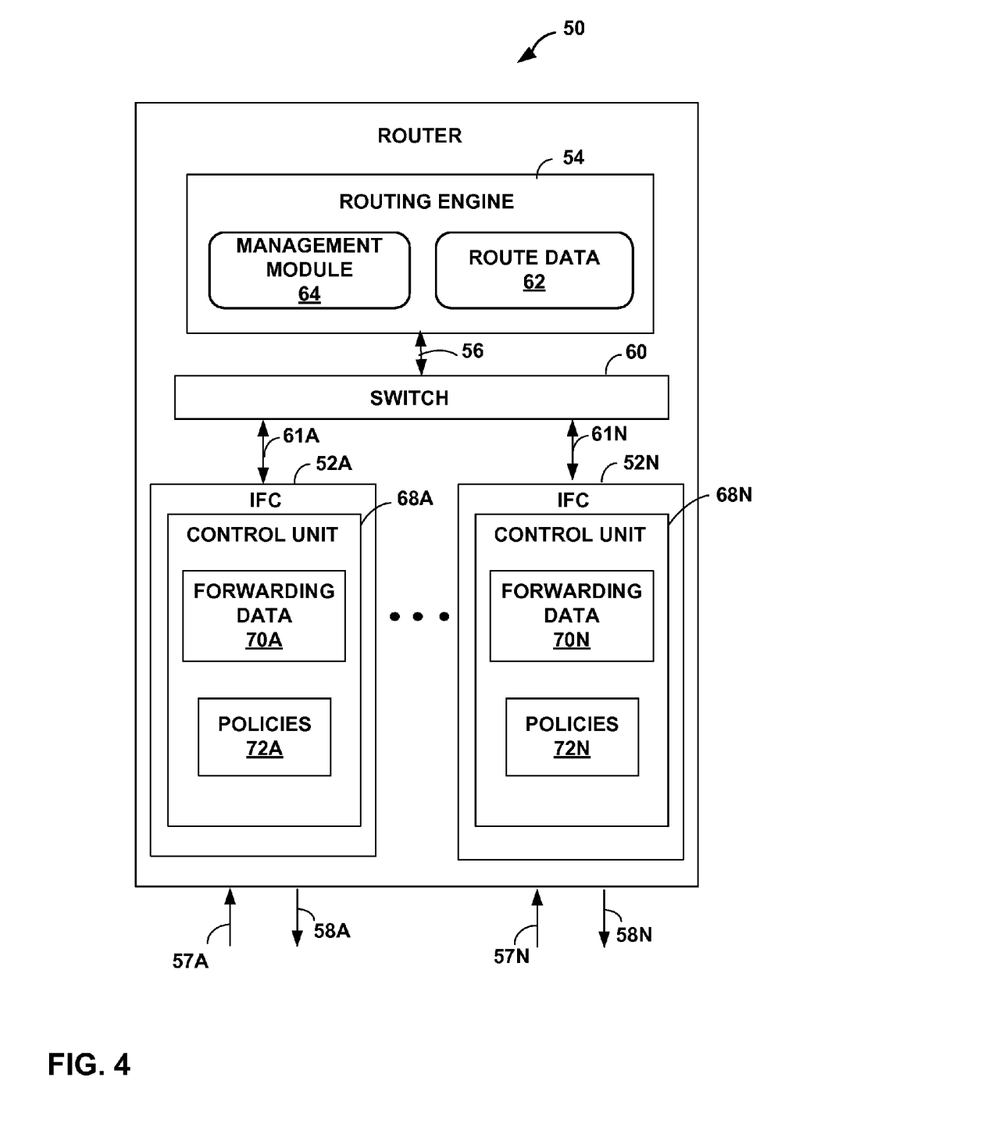
FIG. 4 is a block diagram illustrating an exemplary embodiment of a router that utilizes intermediate CoS information consistent with the principles of the invention.

As illustrated in FIG. 4, the network device need not define and maintain $N^2$ policies to directly map between all of the combinations of the N types of protocol-specific CoS information. For example, the network device may need to only define and maintain 2*N policies using the indirect mapping scheme described herein.

FIG. 4 is a block diagram illustrating an exemplary embodiment of a router 50 that utilizes intermediate CoS information in accordance with the principles of the invention. As illustrated, router 50 includes interface cards 52A-52N (collectively, "IFCs 52") that receive and send packets via network links 57 and 58, respectively. IFCs 52 are typically coupled to network links 57 and 58 via a number of interface ports (not shown).

Router 50 may include a chassis (not shown) having a number of slots for receiving a set of cards, including IFCs 52. Each of IFCs 52 may be inserted into a corresponding slot of the chassis for electrically coupling the card to routing engine 54 via high-speed switch 60 and internal data paths 61A-61N (collectively, "internal data paths 61"). Switch 60 also provides an interconnect path between each of IFCs 52. Switch 60 may comprise, for example, a high-speed switch, switch fabric, switchgear, a configurable network switch or hub, or other switching equipment. Internal data paths 61 may comprise any form of communication paths, such as electrical paths within an integrated circuit, external data busses, optical links, network connections, wireless connections, or other communication paths.

In general, routing engine 54 operates as a control unit for router 50. More specifically, routing engine 54 receives routing information from other routing devices that describes a topology of a network environment and, in particular, routes through one or more networks within the environment. Based on the routing information, routing engine 54 generates route data 62 that describes the routes. Routing engine 54 may maintain route data 62 in the form of one or more tables, databases, link lists, radix trees, databases, flat files, or any other data structure.

Based on route data 62, routing engine 54 generates forwarding data 70A-70N (collectively, "forwarding data 70") for control units 68A-68N (collectively, "control units 68"), respectively. Forwarding data 70 may associate, for example, network destinations with specific next hops and corresponding IFCs 52.

Each of IFCs 52 operate as distributed forwarding components to forward packets in accordance with forwarding data 70. Specifically, IFCs 52 determine a next hop for each inbound packet based on forwarding data 70, identify a corresponding one of the IFCs associated with the next hop, and relay the packet to the appropriate one of IFCs 52 via switch 60 and internal data paths 61.

Routing engine 54 includes a management module 64 that presents an interface, such as a command line interface, by which a user defines and maintains policies 72A-72N (collectively, "policies 72") for application by control units 68. More specifically, control units 68 apply policies 72 to classify CoS information and, in particular, map between protocol-specific CoS information and intermediate CoS information. Consequently, IFCs 52 need only store policies 72 for those respective protocols supported by each of the IFCs.

For example, IFC 52A may receive and send packets to an IP-based forwarding domain, while IFC 52N may receive and send packets to an MPLS forwarding domain. In this example, IFC 52A stores policies 72A for mapping between IP-specific CoS information and intermediate CoS information. Similarly, IFC 52N stores policies 72N for mapping between MPLS-specific CoS information and the intermediate CoS information. Consequently, the respective policies 72 of each of IFCs 52 need not be configured based on the protocols supported by the other IFCs.

The architecture of router 50 shown in FIG. 4 is for exemplary purposes only, and the principles of the invention are not limited to this architecture. Router 50 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of router 50 may be implemented by executing the instructions of the computer-readable medium with one or more processors, discrete hardware circuitry, firmware, software executing on a programmable processor, or a combination of any of the above.

Moreover, router 50 is illustrated for exemplary purposes as having forwarding functionality distributed within IFCs 52. However, the principles of the invention are not so limited. For example, in another embodiment a router may have a centralized forwarding engine that maintains and applies policies 72.

Figure 5:
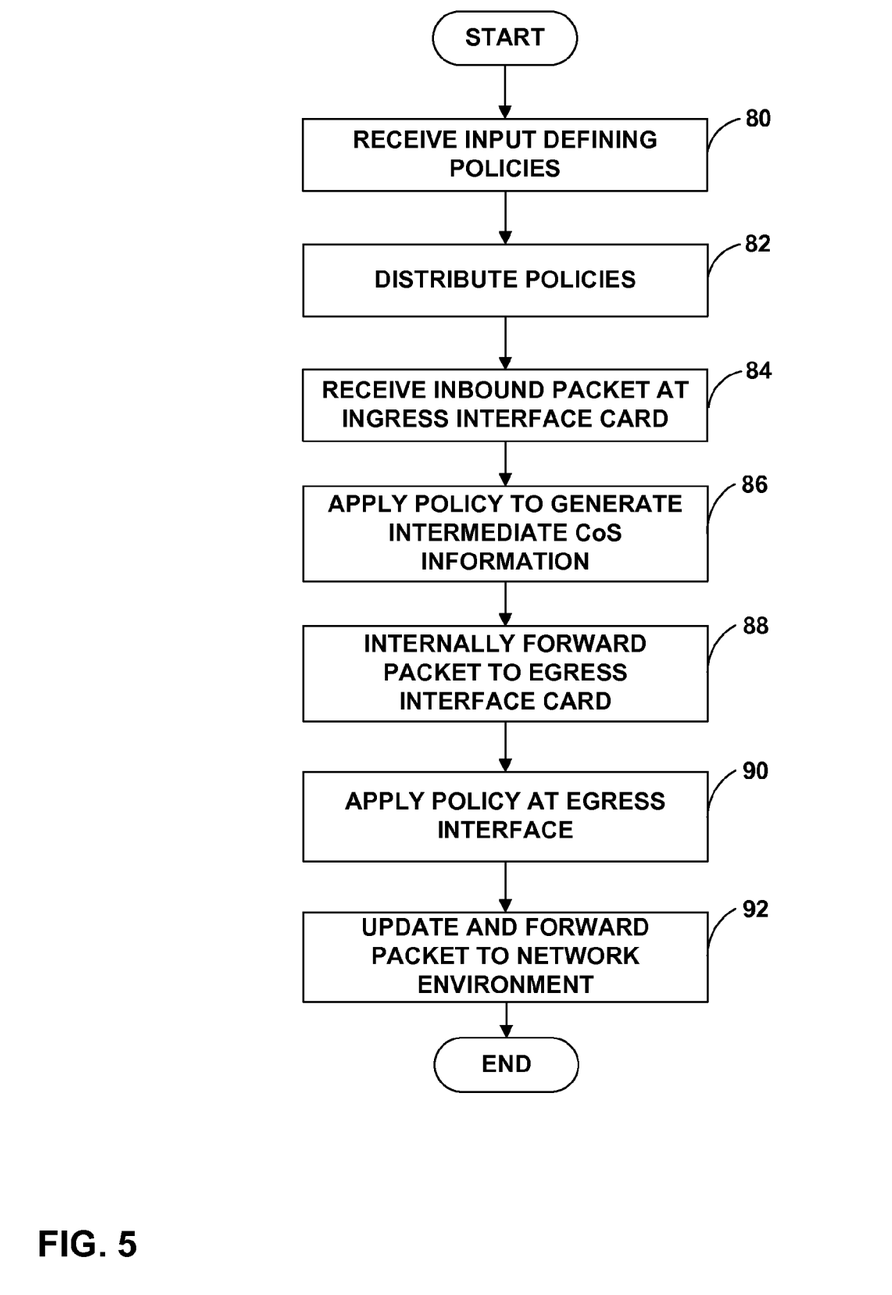
FIG. 5 is a flow diagram illustrating exemplary operation of the router of FIG. 4 consistent with the principles of the invention.

FIG. 5 is a flow diagram illustrating exemplary operation of router 50. Initially, router 50 receives input defining policies 72 (80). For example, router 50 may receive the input from a remote user or automated script via management module 64. As another example, router 50 may receive input from one or more network devices, such as peer routers. Based on the input, routing engine 54 distributes policies 72 to IFCs 52 for application when forwarding packets (82).

Upon receiving an inbound packet (84), one of IFCs 52, e.g., IFC 52A, applies one or more of policies 72A to classify the protocol-specific CoS information of the inbound packet and generate intermediate CoS information (86). For example, IFC 52A may apply an IP-specific policy to generate the intermediate CoS information based on an inbound packet that was received in accordance with the IP protocol.

Based on the intermediate CoS information, IFC 52A forwards the inbound packet to one of IFCs 52 via switch 60 (88).

The receiving one of IFCs 52, such as IFC 52N, receives the packet as an outbound packet, and applies policy to classify the outbound packet's intermediate CoS information based on the outbound transmission protocol to be used (90). For example, IFC 52N may apply a policy to generate MPLS-specific CoS information based on the intermediate CoS information carried by the outbound packet. IFC 52N strips the intermediate CoS information from the outbound packet and otherwise processes the packet for forwarding in accordance with a protocol supported by the IFC, such as MPLS (92).

In this manner, IFCs 52 maintain and apply policies 72 to implement the intermediate policy mapping scheme described herein. For exemplary purposes, FIG. 5 illustrates application of a first policy to a packet via an ingress interface card, e.g., IFC 52A and a second policy to the packet via an egress interface card, e.g., IFC 52N. However, IFCs 52 may apply more than two policies as the packet is processed in accordance with a protocol stack. In other words, a packet may be communicated by the layering of multiple protocols, and policies may be applied by IFCs 52 at various levels of the protocol stack.

Various embodiments of the invention have been described. Although the embodiments have been described in terms of packet-based systems and methods, any type of data units may be used without departing from the principles of the invention. For example, the principles of the invention may be readily applied to a variety of protocols, such as the Transmission Control Protocol (TCP), the User Datagram Protocol (UDP), the Internet Protocol (IP), Asynchronous Transfer Mode (ATM), Frame Relay, and the like. Accordingly, "packet" is used to encompass any such unit of data, and may be interchanged with the term "cell," or other similar terms used in such protocols to describe a unit of data communicated between resources within the network.

In addition, although the techniques have been described as elements embodied within a network device, the described elements may be distributed to multiple devices. The term "system," is used herein to generally refer to embodiments of the invention in which the described elements are embodied within a single network device or distributed to multiple network devices. Further, although the invention has been primarily described in the context of CoS information, some embodiments of the invention may apply to other types of intermediate policy information. These and other embodiments are within the scope of the following claims.

The invention claimed is:

1. A method comprising:
   receiving, with a network device that supports at least three network protocols used within a network, a packet having a first class of service (CoS) information that conforms to a first one of the at least three network protocols, wherein the first CoS information specifies a class of service for the packet in a format that conforms to the first one of the at least three network protocols;
   mapping, with the network device, the first CoS information to a second CoS information using intermediate CoS information that provides a universal classification mechanism independent of: (i) any layer two protocols used within the network, and (ii) protocols of layers on top of layer two protocols used within the network, wherein the second CoS information specifies a class of service for the packet in a format that conforms to a second one of the at least three network protocols; and
   outputting, with the network device, the packet with the second CoS information.

2. The method of claim 1, wherein mapping comprises:
   applying a first policy to map the first CoS information to the intermediate CoS information; and
   applying a second policy to map the intermediate CoS information to the second CoS information.

3. The method of claim 2,
   wherein the first policy comprises a protocol-specific policy in accordance with the first one of the at least three network protocols, and
   wherein the second policy comprises a protocol-specific policy in accordance with the second one of the at least three network protocols.

4. The method of claim 2, further comprising:
   presenting a user interface to receive input; and
   configuring the first policy and the second policy based on the input.

5. The method of claim 1,
   wherein receiving a packet comprises receiving the packet with a first interface of a network device; and
   wherein forwarding the packet comprises forwarding the packet with a second interface of the network device.

6. The method of claim 5, wherein the first interface is associated with a first interface card of a network router, and the second interface is associated with a second interface card of the network router.

7. The method of claim 5, further comprising:
   updating the packet with the first interface to include the intermediate CoS information; and
   communicating the packet and the intermediate CoS information from the first interface to the second interface.

8. The method of claim 7, wherein updating the packet with the first interface comprises adding a header to the packet that specifies the intermediate CoS information.

9. The method of claim 7, wherein forwarding the packet comprises:
   removing the intermediate CoS information from the packet with the second interface;
   updating the packet to include the second CoS information; and
   forwarding the packet with the second CoS information with the second interface.

10. The method of claim 1, wherein the intermediate CoS information comprises protocol-independent metadata associated with the packet.

11. The method of claim 1, wherein the first CoS information and the second CoS information each comprise one of Internet Protocol (IP) Type of Service (ToS) information, Multiprotocol Label Switching (MPLS) experimental (EXP) bits, Virtual Local Area Network (VLAN) user priority information, and Internet Protocol version 6 (IPv6) traffic class information.

12. The method of claim 1,
   wherein receiving a packet comprises receiving the packet with a router; and
   wherein forwarding the packet comprises forwarding the packet with the router.

13. The method of claim 12, wherein forwarding the packet comprises forwarding the packet with a centralized forwarding engine of the router.

14. The method of claim 12, wherein forwarding the packet comprises forwarding the packet with a forwarding component within an interface card of the router.

15. A system that supports at least three network protocols used within a network, the system comprising:
- a first interface to receive a packet having a first class of service (CoS) information that conforms to a first one of the at least three network protocols, wherein the first interface maps the first CoS information to intermediate CoS information, wherein the intermediate COS information provides a universal classification mechanism independent of: (i) any layer two protocols used within the network, and (ii) protocols of layers on top of layer two protocols used within the network; and
- a second interface to map the intermediate CoS information to a second CoS information that specifies a class of service for the packet in a format that conforms to a second one of the at least three network protocols.

16. The system of claim 15,
- wherein the first interface applies a first policy to map the first CoS information to the intermediate CoS information; and
- wherein the second interface applies a second policy to map the intermediate CoS information to the second CoS information.

17. The system of claim 16, wherein the first policy comprises a protocol-specific policy in accordance with the first one of the at least three network protocols, and the second policy comprises a protocol-specific policy in accordance with the second one of the at least three network protocols.

18. The system of claim 16, further comprising a management module to present a user interface to receive input, and configure the first policy and the second policy based on the input.

19. The system of claim 15, wherein the first interface is associated with a first interface card of a network router, and the second interface is associated with a second interface card of the network router.

20. The system of claim 15, wherein the first interface adds the intermediate CoS information to the packet, and communicates the packet and the intermediate CoS information to the second interface.

21. The system of claim 20, wherein the second interface removes the intermediate CoS information from the packet, and adds the second CoS information to the packet.

22. The system of claim 15, wherein the intermediate CoS information comprises protocol-independent metadata associated with the packet.

23. The system of claim 15, wherein the first CoS information and the second CoS information each comprise one of Internet Protocol (IP) Type of Service (ToS) information, Multiprotocol Label Switching (MPLS) experimental (EXP) bits, Virtual Local Area Network (VLAN) user priority information, and Internet Protocol version 6 (IPv6) traffic class information.

24. The system of claim 15, wherein the first interface comprises a logical interface associated with the first protocol, and the second interface comprises a logical interface associated with the second protocol.

25. The system of claim 15, wherein the first interface is associated with a first interface card, and the second interface is associated with a second interface card.

26. A network device for operation within a network that supports at least three network protocols, wherein the network device comprises:
- a control unit that receives a packet having a first class of service (CoS) information that conforms to a first one of the at least three network protocols, wherein the first CoS information specifies a class of service for the packet in a format that conforms to the first one of the at least three network protocols, maps the first CoS information to a second CoS information using intermediate CoS information that provides a universal classification mechanism independent of: (i) any layer two protocols used within the network, and (ii) protocols of layers on top of layer two protocols used within the network, wherein the second CoS information specifies a class of service for the packet in a format that conforms to a second one of the at least three network protocols and outputs the packet with the second CoS information.

27. The network device of claim 26, wherein the network device applies policies to map the first CoS information to the intermediate CoS information and to map the intermediate CoS information to the second CoS information.

28. The network device of claim 26, wherein the network device comprises a router.

29. A non-transitory computer-readable medium comprising instructions to cause a processor to:
- receive a packet having a first class of service (CoS) information that conforms to a first one of at least three network protocols used within a network, wherein the first CoS information specifies a class of service for the packet in a format that conforms to the first one of the at least three network protocols;
- map the first CoS information to a second CoS information using intermediate CoS information that provides a universal classification mechanism independent of: (i) any layer two protocols used within the network, and (ii) protocols of layers on top of layer two protocols used within the network, wherein the second CoS information specifies a class of service for the packet in a format that conforms to a second one of the at least three network protocols; and
- output the packet with the second CoS information.

* * * * *